Nov. 14, 1939.  R. S. ELLIS  2,180,278
MEANS FOR SEPARATING PARTICLES OF SOLID MATERIAL
Filed May 18, 1939   3 Sheets-Sheet 1
FIG. I.
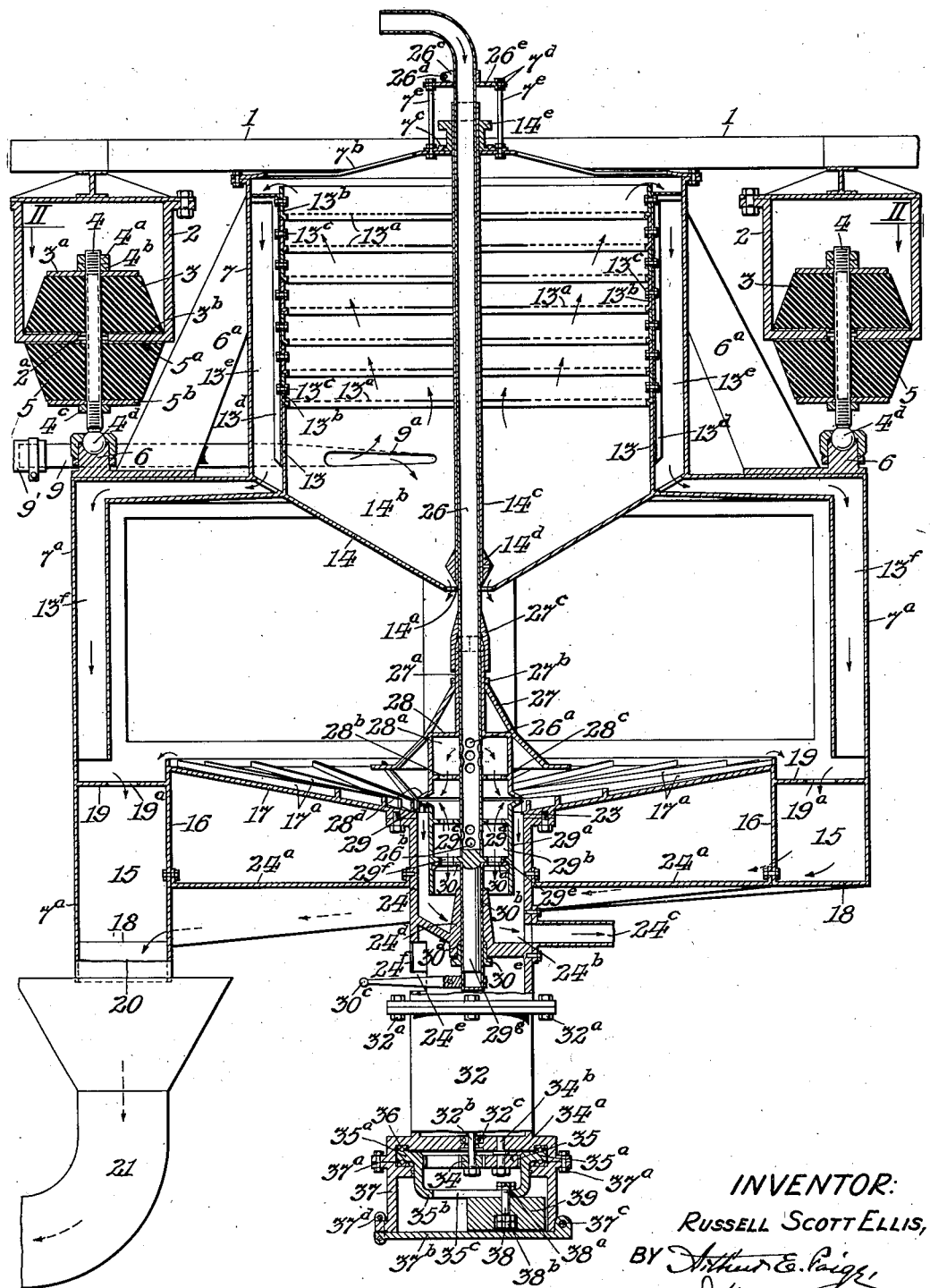
INVENTOR:
RUSSELL SCOTT ELLIS,
BY
Attorney.

Nov. 14, 1939.  R. S. ELLIS  2,180,278
MEANS FOR SEPARATING PARTICLES OF SOLID MATERIAL
Filed May 18, 1939  3 Sheets—Sheet 2
FIG. II.
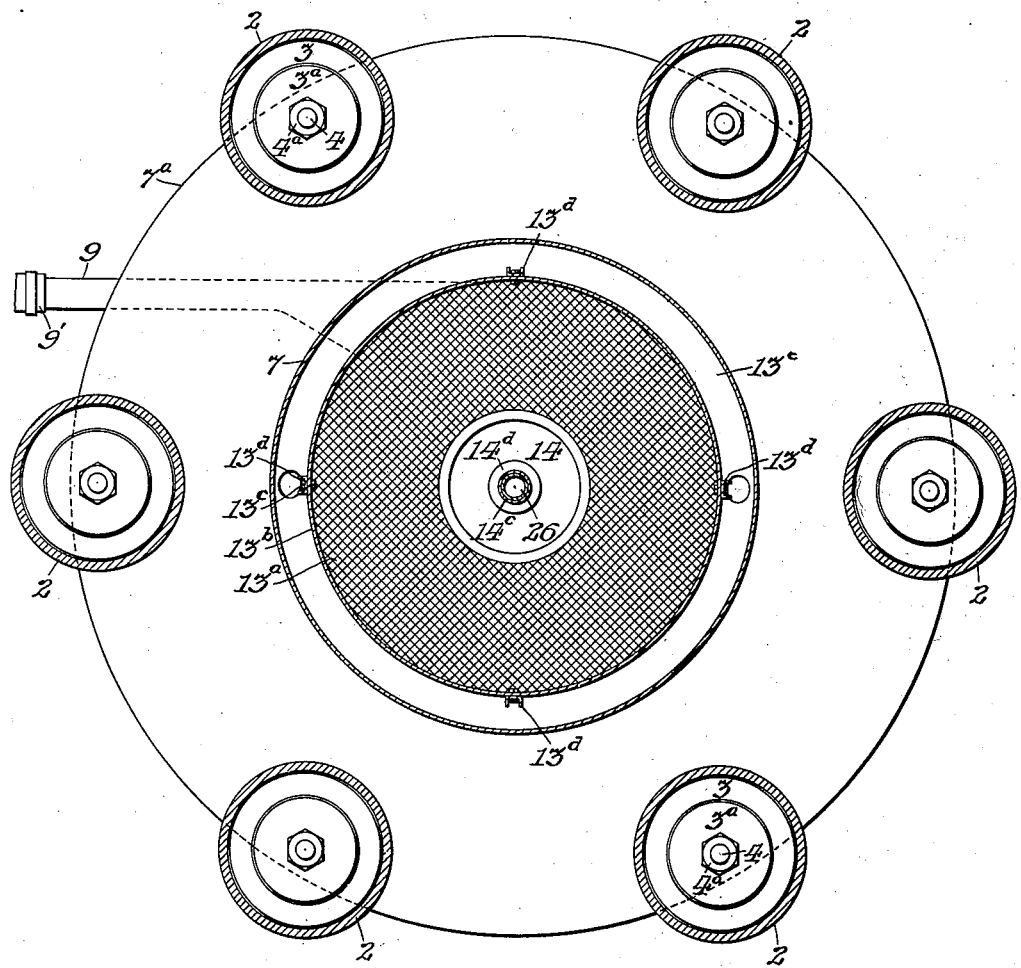
FIG. V.
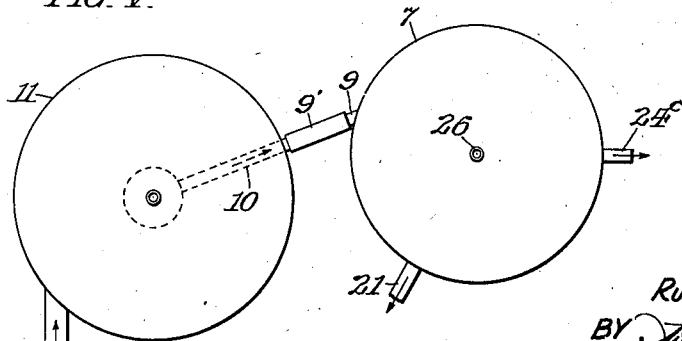
INVENTOR:
RUSSELL SCOTT ELLIS,
BY
Attorney.

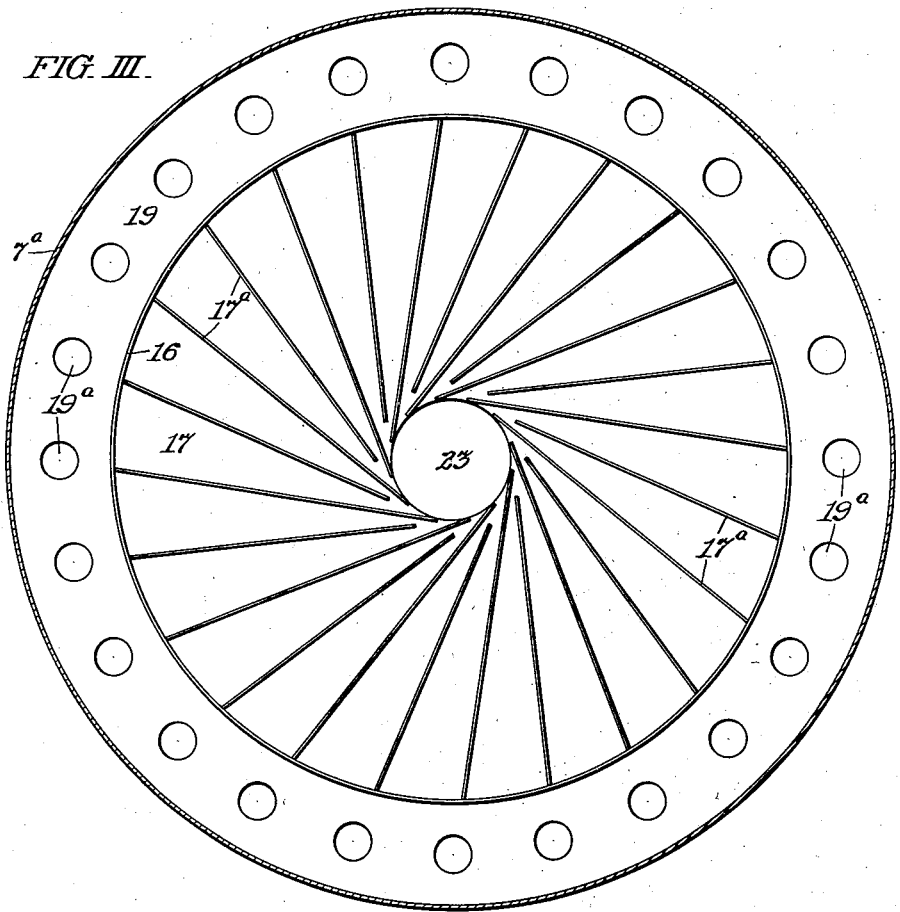
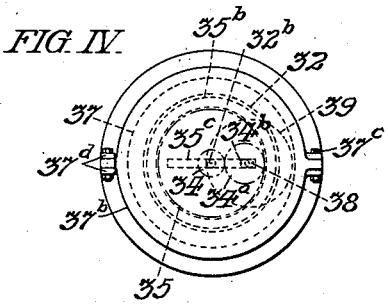

Patented Nov. 14, 1939

2,180,278

UNITED STATES PATENT OFFICE 2,180,278

MEANS FOR SEPARATING PARTICLES OF SOLID MATERIAL

Russell Scott Ellis, Vineland, N. J.

Application May 18, 1939, Serial No. 274,322

4 Claims. (Cl. 209—18)

My invention is of the class described in Letters Patent of the United States No. 2,104,537 granted to me January 4, 1938, and is applicable to any material particles of different sizes or specific gravity or both, for instance, natural sands, and particularly sands containing titanium, by the application to such material of water or other fluid, or mixture of fluids, to generate centrifugal and centripetal forces and effect flotation and gravitation, and consequent separation, of the different particles.

The apparatus disclosed in said patent includes a plurality of separator casings utilized as distinct receptacles for the material to be treated, disposed in a vertical series, and connected in series relation by conduits through which solid material which is not precipitated in the lowermost receptacle is delivered into the next higher receptacle, and the material which is not precipitated in the second receptacle is delivered into a third receptacle, and so on, the materials precipitated in the several receptacles being discharged separately from the bottoms thereof, and the finest particles of material, finally separated by flotation, being discharged from the top receptacle.

My present invention includes apparatus which may be employed in accessory relation with the patented apparatus, in connection with any one of the material discharge outlets of such apparatus as disclosed in said patent or to any other source of supply of the material particles to be treated. The present apparatus includes a casing of circular configuration with its axis vertically disposed and provided with an inlet for the material in tangential relation to said casing and separate outlets for solid materials of different specific gravity. Between said inlet and said outlets I provide a table, preferably of circular configuration, and of slightly conical, truncated form, with its truncated portion downward. Said table is provided with baffle means between said material inlet and outlets including a circular series of upwardly projecting ridges on said table in tangential relation to the outlet for the precipitated material which is through the axial truncated bottom of the table; so that each of said baffle ridges forms a riffle which deflects the precipitated material centripetally toward said outlet in approximately involute paths.

The present invention includes means to shake said table and the material particles thereon by imparting slight gyratory movement and consequent vibrations to the table and to said particles, with the effect of facilitating the gravitation of the heavier particles from the lighter particles of said material.

I have found the form of my invention chosen for illustration to be particularly efficacious in the employment of water as a flotation fluid in delivering sand into the apparatus and separating from the sand, particles of titanium, all of which will pass through a sieve having forty meshes to the inch but may be caught on a sieve having sixty meshes to the inch; the titanium particles being precipitated and discharged through the axial outlet at the bottom of said table, whereas the sand particles are discharged with the flotation water through another outlet.

In addition to the flotation water which is the medium for introducing the particles of solid material to the apparatus; I provide a flotation fluid inlet conduit which extends downwardly through the top of the apparatus and the axial opening in said table, in coaxial relation therewith, through which flotation water is delivered into the casing under pressure, between horizontal circular spreader plates provided with means for varying the area of the fluid passage between them, above said table, and part of the water supplied by said axial conduit is delivered laterally into the apparatus below said spreader plates to facilitate the discharge of the precipitated material passing downward through said table to a lateral outlet at the bottom of the apparatus.

My invention includes the various novel features of construction, arrangement, and method of operation hereinafter more definitely specified, but it is to be noted that it is not essential that the gyratory table be of the conical shape shown to effect separation in accordance with my invention. On the contrary, I find that some materials may be separated on a table which is horizontal and some materials may be separated on a table which is conical with its apex upward.

However, in each of those forms of my invention, separation is attained by centrifugal and centripetal forces and flotation effect of fluid moving under pressure, in conjunction with a differential force of gravity upon the different particles of the material being separated.

In said drawings:

Fig. I is a vertical sectional view of an apparatus conveniently embodying my invention.

Fig. II is a plan sectional view taken on the line II, II in Fig. I.

Fig. III is a plan view of the riffle table shown in section in Fig. I.

Fig. IV is an inverted plan view of the gearing casing, shown at the bottom of Fig. I, and with the gearing for effecting gyration of the apparatus indicated therein.

Fig. V is a diagrammatic plan view showing the apparatus of Fig. I in cooperative connection with a material outlet of a separator casing of the class shown in said patent.

Referring to Fig. I; the upper framework 1 supports the entire apparatus pendent therefrom, with freedom for gyration and vibration as above contemplated.

Said framework 1 supports a circular series of cup-shaped hangers 2, of which there are conveniently six, as shown in Fig. II. Each of said hangers contains a circular body of resilient material 3, conveniently rubber, having at the top thereof a metallic washer $3^a$ supporting a bolt 4 by jam nuts $4^a$ and $4^b$. Said body 3 has at the bottom thereof a metallic washer $3^b$ resting upon the bottom of said hanger 2, and said bolt 4 depends through the axial opening $2^a$ in the bottom of said hanger 2 and is surrounded by the circular body 5 similar to the body 3 having at its upper end the metallic washer $5^a$ and at its lower end the metallic washer $5^b$, which rests upon the nut $4^c$ on said bolt. The lower end of each of said bolts 4 forms a ball $4^d$ which is fitted in a respective ball bearing 6 rigidly connected with the angle bracket $6^a$ with which the outer casing of the apparatus, including the cylindrical members 7 and $7^a$, are rigidly connected and thus supported with freedom of gyratory vibration upon the resilient body 3. Of course, said resilient bodies 3 and 5 may be more or less compressed by adjustment of the nuts $4^c$ upon the bolts 4 to limit the freedom of gyratory movement aforesaid.

The solid particles of material to be separated are introduced to the apparatus in the flotation fluid under pressure supplied through the rigid inlet conduit 9, shown in Figs. I and II, extending in tangential relation to the casing member 7. However, connection is made from said conduit 9 to the source of the material through the flexible hose 9' which permits the gyratory movement and vibration above contemplated.

As indicated in Fig. V; the hose 9' may be connected with the outlet 10 of a separator casing 11 of the type above described with reference to said patent. However, as above noted, it may be connected to any other source of material particles to be separated.

As shown in Figs. I and II, said outer casing member 7 contains the cylindrical partition 13 in radially spaced relation therewith, and forming an inclosure which receives the material from the conduit 9 through the port $9^a$. Said partition is rigidly connected with the conical hopper 14 having at its truncated lower end the axial orifice $14^a$, the effective area of which may be adjustably varied as hereinafter described, and through which a portion of the flotation water flows with the material to be separated.

Said partition 13 and hopper 14 form a settling chamber $14^b$ in which the solid material may gravitate from the flotation liquid and, to suppress the surges of flotation material coming through said port $9^a$ into said chamber, I prefer to provide a series of annular surge baffles $13^a$ formed of foraminous material, preferably wire netting, each such baffle being mounted in a weir ring $13^b$ of which from one to seven may be secured in vertical series upon and in alinement with said partition 13 in accordance with the head pressure of flotation liquid which it is desired to maintain above said axial orifice $14^a$. Said weir rings are conveniently rigidly connected by bolts $13^c$ with angle brace bars $13^d$, as shown in Fig. I.

Said partition 13 forms, with any desired number of said weir rings $13^b$, a cylindrical weir, over which a portion of the flotation water introduced through the port $9^a$ flows into the annular space $13^e$ between said casing member 7 and weir partition 13, and is directed outwardly and downwardly through the weir fluid conduits $13^f$ which are rigidly connected with the inner circumference of the outer casing member $7^a$, as indicated in Fig. I. The flotation fluid which thus overflows falls into the annular space 15 between said outer casing member $7^a$ and the cylinder 16 which is rigidly connected with the perimeter of the circular riffle table 17 and with the annular bottom plate closure 18 of said casing member $7^a$. As shown in Fig. I, said outer casing cylinder $7^a$ and the inner cylinder 16 are also rigidly connected by the horizontal annular plate 19 which, as shown in Fig. II, has numerous openings $19^a$ therethrough for the passage of the flotation liquid discharged theeon through the weir fluid conduits $13^f$. As shown in Fig. I, the bottom closure 18 of the apparatus casing is inclined to discharge said flotation fluid by gravity to and through the outlet 20, shown at the left of Fig. I. The fluid thus discharged and conveying more or less sand may be directed away from the apparatus through the conduit 21, shown at the left of Fig. I.

Referring to Figs. I and III; said table 17 is provided with baffle means between said material inlet and outlets including a circular series of upwardly projecting ridges $17^a$, fixed on said table in tangential relation to the outlet 23 forming approximately involute paths between said ridges. Said outlet 23 is in registry with the cylindrical outlet fitting 24 which, as shown in Fig. I, is rigidly connected with the bottom of said table and also connected by radial braces $24^a$ with said inner cylinder 16 of the apparatus casing. Said fitting 24 has the lateral discharge outlet $24^b$ connected with the discharge conduit $24^c$ for the heavy material precipitated from said table 17, which material is directed away from the apparatus through said conduit $24^c$.

The flotation fluid received as above described through the port $9^a$ into the chamber $14^b$ and part of which passes thence through the axial orifice $14^a$ upon the table 17 with the material to be separated, is supplemented by flotation fluid injected under pressure through the flotation fluid inlet conduit 26 which extends downwardly through the top plate $7^b$ of the outer casing of the apparatus and the axial orifice $14^a$ in said table, in coaxial relation therewith. Said conduit 26 supports the sleeve $14^c$ having at the lower end thereof the conical collar $14^d$ which is vertically adjustable on said conduit 26 by the nut $14^e$ engaging a screw thread on said sleeve. As shown in Fig. I, said nut $14^e$ is mounted to turn in the bearing $7^c$ fixed on the top plate $7^b$ of the outer casing of the apparatus. The arrangement is such that said collar $14^d$ may be manually raised or lowered with respect to the orifice $14^a$ to adjustably vary the effective area thereof and the volume of flotation fluid and solid material permitted to fall therethrough upon the table 17, upon which the material is distributed radially by the distribution baffle 27, which is a truncated cone with its apex upward and provided with a horizontal flange at its lower end larger in diameter than said outlet 23.

As shown in Fig. I; said baffle 27 is supported by the sleeve 27ª which is slip-fitted on said conduit 26 and externally screw threaded to engage the lock nut 27ᵇ which bears upon the upper end of said baffle 27 and detachably holds it in rigid relation with the cylindrical fluid receptacle 28 which is in rigid relation with the lower end of said sleeve 27ª. Said receptacle 28 forms the chamber 28ª surrounding the group of lateral vents 26ª in the conduit 26 through which a portion of the additional flotation fluid is delivered into said receptacle 28 and passes downwardly through a circular series of ports 28ᵇ in the diaphragm 28ᶜ. The upper end of said sleeve 27ª is tapered and split to form several conical sectors bearing upon said conduit 26 within the clamp nut 27ᶜ so that by screwing said nut 27ᶜ downward, the operator may rigidly clamp said receptacle 28 in any desired position of vertical adjustment to thus precisely locate the position of the circular spreader flange 28ᵈ which is in integral relation with the lower end of said receptacle 28. Said spreader flange 28ᵈ is axially opposed to the spreader flange 29 which is in integral relation with the upper end of the receptacle 29ª which is rigidly connected with the lower end of said axial conduit 26 and forms the chamber 29ᵇ surrounding the group of lateral vents 26ᵇ in the conduit 26. The additional flotation fluid thus supplied in the chamber 29ᵇ is distributed upwardly through the circular series of ports 29ᶜ in the diaphragm 29ᵈ, from which it flows over said circular spreader flange 29. The effective area of the completely annular fluid passageway between the opposed spreader flanges 28ᵈ and 29 is adjustably variable by raising or lowering said axial conduit 26 carrying the spreader flange 29. I find it convenient to effect such adjustment by the collar 26ᶜ shown at the upper end of said conduit in Fig. I, which may be rigidly clamped upon said conduit by the bolt 26ᵈ. Said collar is tightly connected with the plate 26ᵉ which is clamped between pairs of nuts 7ᵈ engaging bolt standards 7ᵉ which are fixed at their lower ends in said top plate 7ᵇ of the apparatus and also serve to detachably secure the bearing 7ᶜ.

The annular diaphragm 29ᵉ at the bottom of said chamber 29ᵇ includes a circular series of ports 29ᶠ through which a portion of the additional flotation fluid gravitates into the fitting 24 to facilitate the discharge of the heavy material from said fitting through the conduit 24ᶜ. In order to adjustably vary the volume of flotation fluid thus discharged through said ports 29ᶠ, I find it convenient to employ the plate valve 30 which has a circular series of ports 30ª therethrough adapted to register with or more or less obstruct, the circular series of ports 29ᶠ in said diaphragm 29ᵉ. Said valve 30 has the sleeve 30ᵇ slip-fitted on the axial shaft 29ᵍ which is in integral relation with said receptacle 29ª. Said sleeve 30ᵇ is slip-fitted in the bearing 24ᵈ which is in integral relation with said outlet fitting 24. Said valve 30 may be turned by the operator by means of the handle 30ᶜ which is clamped upon the lower end of said sleeve 30ᵇ and projects through the opening 24ᵉ in said outlet fitting 24. The arcuate plate 24ᶠ is fixed upon the circumference of said outlet fitting 24 and provided with an arcuate series of graduations so that the operator may determine the precise position of said valve 30. Said valve may be clamped in adjusted position by the packing ring 30ᵈ which encircles it in said bearing 24ᵈ and which may be compressed to clamp said sleeve 30ᵇ by means of the gland 30ᵉ.

I find it convenient to shake the riffle table 17 by gyrating the casing 7, 7ª by means of the electric motor 32, the cylindrical frame of which is conveniently detachably rigidly connected with the lower end of said outlet fitting 24, by means of the bolts 32ª, as indicated in Fig. I. The armature shaft 32ᵇ of said motor which is journaled in ball bearings 32ᶜ, one of which is shown in Fig. I, carries at its lower end the gear pinion 34 which is in mesh with the idle gear 34ª which is journaled on the stud shaft 34ᵇ fixed in the lower end of the frame of said motor 32. Said gear 34ª is in mesh with the internal gear 35 which has the annular horizontal flange 35ª journaled in ball bearings 36 between the lower end of the frame of said motor 32 and the crank casing 37, which is detachably rigidly connected with said motor frame by the bolts 37ª. The pendent U-shaped web 35ˢ of said internal gear 35 has the crank slot 35ᶜ in diametrical relation with the axis of said gear. The crank bolt 38, which is pendent through said slot 35ᶜ supports the eccentric weight 39 which the operator may clamp in any desired position of eccentricity with respect to the axis of rotation of said gear 35, by means of the nuts 38ª and 38ᵇ respectively at the top and bottom ends of said bolt 38.

Said weight 39 is shown in Fig. I secured to the gear 35 in a position which is nearly the most eccentric to which it may be adjusted. When in its most eccentric position, the rotation of said gear affords the maximum gyratory force for shaking the riffle table 17 and, of course, that force may be reduced to zero at the will of the operator by shifting said crank bolt 38 and weight 39 into coaxial relation with said internal gear 35. To permit such adjustment, I find it convenient to provide the lower end of the crank casing 37 with the door 37ᵇ hingedly connected therewith by the pintle 37ᶜ; the opposite side of said door being provided with the latch 37ᵈ to permit the door to be rigidly secured in the closed position shown.

However, any other suitable means may be provided for shaking said riffle table 17. Therefore, I do not desire to limit myself to the precise details of construction, arrangement, or method of operation herein set forth, as it is obvious that various modifications may be made therein without departing from the essential features of my invention, as defined in the appended claims.

I claim:

1. In means for separating particles of solid material by flotation; the combination with a separator casing of circular configuration in a horizontal plane; of an inlet conduit for the material to be separated, extending laterally into the side of said casing; an outlet from said casing, for the lighter solid material; an outlet for the heavier material, at the bottom of said casing; a riffle table in said casing having an axial outlet therethrough and a circular series of riffle ridges, on its upper surface, in tangential relation with said outlet; said riffle ridges being disposed to centripetally direct the precipitated material toward its axial outlet; a flotation fluid conduit extending into said casing in coaxial relation with said table outlet, having lateral fluid vents above said table and having an annular spreader flange terminating in a horizontal lip at its perimeter over which the flotation fluid is distributed radially onto said table; whereby the lighter solid material is levitated centrifugally over the perimeter of said table and discharged through its casing outlet, and the heavier material is precipitated centripetally on said table and through its axial outlet in the table and from the casing, by said flotation fluid.

2. A structure as in claim 1; including a second spreader flange, axially opposed, in spaced relation to said first spreader flange; and means for adjustably varying the effective area of the space between said flanges by relative axial movement of said flanges.

3. A structure as in claim 1; including means for effecting shaking movement of the table.

4. A structure as in claim 1; including means for effecting shaking movement of the table by gyratory movement of the casing with respect to the axis of said opening in the table and discharge outlet from the casing, including a weight, and means for progressing said weight circumferentially with respect to said axis, in eccentric relation therewith.

RUSSELL SCOTT ELLIS.